(12) United States Patent
Anderson et al.

(10) Patent No.: US 7,770,909 B2
(45) Date of Patent: Aug. 10, 2010

(54) ARTICULATED VEHICLE STABILIZATION SYSTEM

(75) Inventors: Eric R Anderson, Galena, IL (US); Daniel D Radke, Dubuque, IA (US)

(73) Assignee: Deere & Company, Moline, IL (US)

( * ) Notice: Subject to any disclaimer, the term of this patent is extended or adjusted under 35 U.S.C. 154(b) by 706 days.

(21) Appl. No.: 11/186,563

(22) Filed: Jul. 21, 2005

(65) Prior Publication Data

US 2008/0164664 A1 Jul. 10, 2008

(51) Int. Cl.
*B62D 53/006* (2006.01)

(52) U.S. Cl. .............. 280/432; 280/5.501; 280/683

(58) Field of Classification Search .......... 280/5.501, 280/5.506, 5.507, 5.51, 5.512, 682, 683, 280/676, 677, 104, 432; 180/235
See application file for complete search history.

(56) References Cited

U.S. PATENT DOCUMENTS

| | | | | |
|---|---|---|---|---|
| 3,211,498 A * | 10/1965 | Peller | | 298/22 P |
| 5,383,680 A * | 1/1995 | Bock et al. | | 280/5.503 |
| 5,538,266 A * | 7/1996 | Martin et al. | | 280/6.154 |
| 5,865,444 A | 2/1999 | Kempf et al. | | |
| 5,882,031 A | 3/1999 | VanDenberg | | |
| 5,971,425 A | 10/1999 | Dinsley et al. | | |
| 6,116,697 A * | 9/2000 | Smith et al. | | 298/22 R |
| 6,460,872 B2 * | 10/2002 | Cadden | | 280/678 |
| 6,585,286 B2 * | 7/2003 | Adema et al. | | 280/677 |
| 6,631,773 B1 * | 10/2003 | Walker | | 180/24.09 |
| 6,641,223 B2 * | 11/2003 | Kingston | | 298/22 P |
| 6,668,225 B2 * | 12/2003 | Oh et al. | | 701/70 |
| 6,679,504 B2 * | 1/2004 | Delorenzis et al. | | 280/5.507 |
| 6,715,579 B1 | 4/2004 | Hendron | | |
| 7,178,824 B2 * | 2/2007 | Ziech | | 280/678 |
| 2005/0051373 A1 | 3/2005 | Bernhardt et al. | | |
| 2005/0110242 A1 * | 5/2005 | Ziech | | 280/677 |
| 2005/0154512 A1 * | 7/2005 | Schubert et al. | | 701/38 |
| 2007/0145809 A1 * | 6/2007 | Timoney et al. | | 298/22 P |

FOREIGN PATENT DOCUMENTS

JP 61-57467 * 3/1986

OTHER PUBLICATIONS

JP 61-57467, official english translation of patent.*
Harold Josephs and Ronald L. Hutson, Dynamics of Mechanical Systems: Chapter 6, Copyright © 2002 by CRC Press LLC.*
Chris H. Luebkeman and Donald Peting, Lecture 4: What is a Force?, Copyright © 1995,1996, available at, http://darkwing.uoregon.edu/~struct/courseware/461/461_lectures/461_lecture4/461_lecture4.html (last visited Aug. 6, 2008).*
John Deere, 350D 400D, date unknown.
John Deere, 250D 300D, date unknown.

* cited by examiner

*Primary Examiner*—Paul N. Dickson
*Assistant Examiner*—Timothy Wilhelm
(74) *Attorney, Agent, or Firm*—Baker & Daniels LLP

(57) ABSTRACT

An articulated vehicle is provided including a stabilization system configured to resist roll-over of a trailer portion of the vehicle.

17 Claims, 5 Drawing Sheets

ARTICULATED VEHICLE STABILIZATION SYSTEM

BACKGROUND AND SUMMARY OF THE INVENTION

The present invention relates to articulated vehicles and, more particularly, to a stabilization system for resisting the roll-over of an articulated vehicle.

Articulated vehicles, such as articulated dump trucks (ADT's) are well-known in the art. For example, ADT's typically include a cab portion having a first frame supporting an operator cab, and a trailer portion having a second frame supporting a bin. The bin is configured to contain a load and is typically coupled to an actuator for angular movement relative to the second frame. The first frame and the second frame may be operably coupled through a universal joint including a pivot frame coupling for providing articulated movement of the first frame relative to the second frame about a vertical axis, and an oscillation frame coupling for providing oscillatory movement of the second frame relative to the first frame about a longitudinal axis. A first wheel assembly supports the first frame, and a second wheel assembly supports the second frame. The second wheel assembly includes a rotatably supported front wheel and a rotatably supported rear wheel. The front wheel and the rear wheel are coupled to a tandem or walking beam which, in turn, is pivotally coupled to the second frame by a tandem coupling. As such, the front wheel and the rear wheel are supported for pivoting movement about the tandem coupling to facilitate continuous wheel engagement over rough terrain.

ADT's may suffer from stability issues when not operated or loaded correctly. For example, instability may arise from the ADT being poorly loaded (too much weight too far forward on the bin), being near the end of the articulation range, and may be aggravated by operating in such a condition at relatively high speeds. Such stability issues may result in a "bin dump" condition where the center of gravity of the trailer portion moves outwardly over a line of action extending from the pivot frame coupling to the tandem coupling. In this condition, the trailer portion rolls over while the cab portion remains upright. While such a roll-over typically does not cause permanent equipment damage or operator injury, it causes the ADT and a related excavator to be out of commission until the trailer portion is uprighted.

According to an illustrative embodiment of the present invention, a vehicle includes a chassis having a cab portion, a trailer portion, and a coupling assembly being positioned between the cab portion and the trailer portion. The trailer portion is configured to support a load, and defines a longitudinal axis and a center of gravity. The coupling assembly includes a pivot coupling configured to provide pivoting movement between the cab portion and the trailer portion about a vertical axis. A wheel assembly is coupled to the trailer portion. A line of action is associated with the trailer portion. A stabilization system is operably coupled to the chassis, and is configured to move the line of action outwardly in response to changes in a vehicle condition.

According to a further illustrative embodiment of the present invention, a vehicle includes a first frame, a first wheel assembly operably coupled to the first frame, a second frame defining a longitudinal axis, and a second wheel assembly operably coupled to the second frame. The second wheel assembly includes a tandem pivotally coupled to the second frame at a pivot coupling, a front wheel rotatably supported by the tandem, and a rear wheel rotatably supported by the tandem. A bin is supported by the second frame and is configured to support a load. A frame coupling is positioned between the first frame and the second frame, and is configured to provide pivoting movement between the first frame and the second frame about a vertical axis. A vehicle condition sensor is configured to detect a condition of the vehicle. A controller is in communication with the vehicle condition sensor. A stabilizer is operably coupled to the second frame and the tandem, and is configured to restrict pivoting movement of the tandem in response to the condition sensed by the vehicle condition sensor.

According to yet another illustrative embodiment of the present invention, a method of stabilizing a vehicle includes the steps of providing a vehicle having a first frame and a second frame that are pivotally connected to one another by a pivot frame coupling to steer the vehicle. The first frame has a first wheel assembly and the second frame has a second wheel assembly. The second wheel assembly includes a tandem pivotally coupled to the second frame, a front wheel rotatably supported by the tandem and a rear wheel rotatably supported by the tandem. A stabilizer is operably coupled to the tandem. The method further includes the step of pivoting the first frame relative to the second frame about the pivot coupling. The method also includes the steps of sensing a vehicle condition and controlling the stabilizer in response to the sensed vehicle condition.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
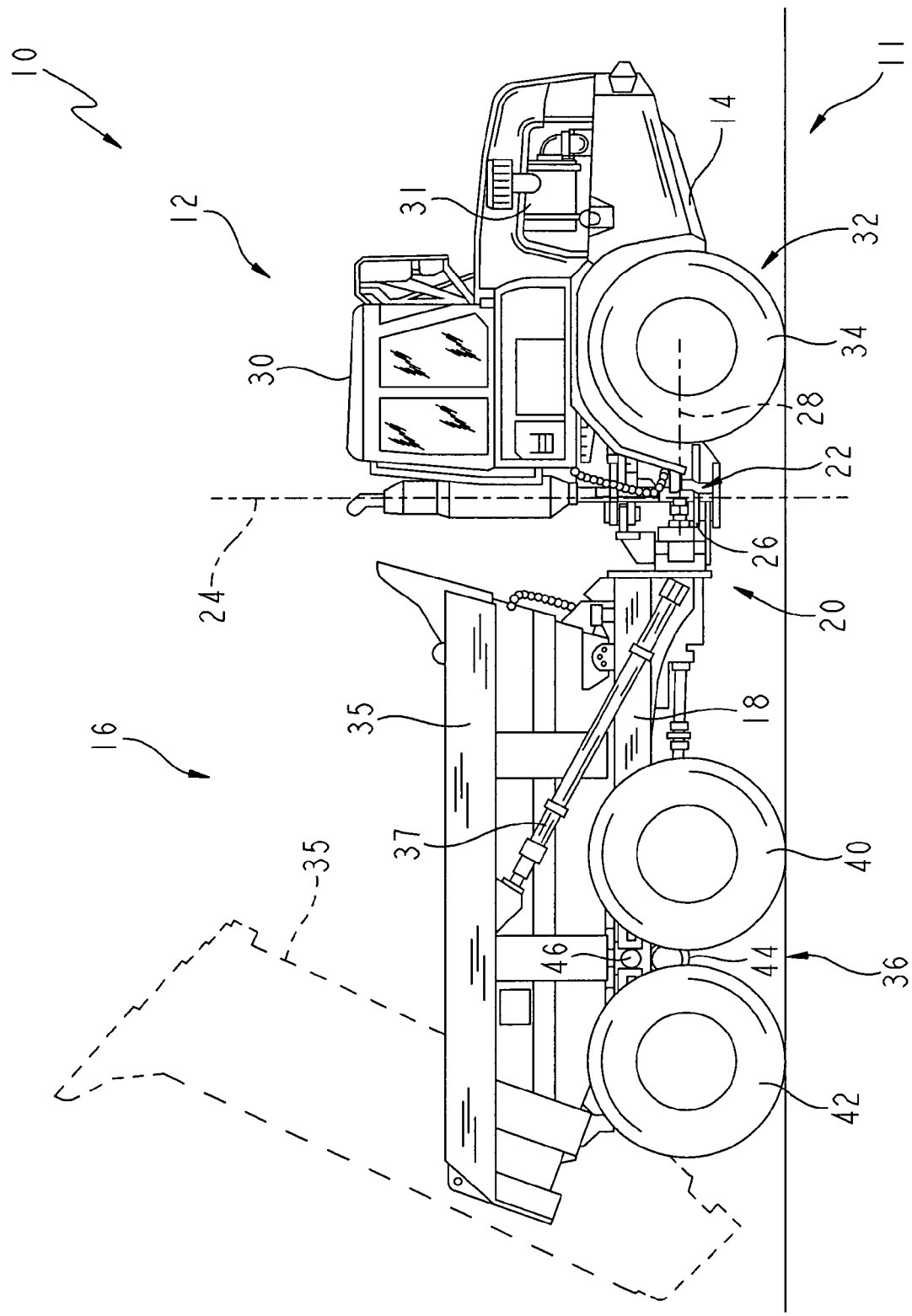
FIG. 1 is a side elevational view of an illustrative embodiment articulated vehicle incorporating the stabilization system of the present disclosure.
Figure 2:
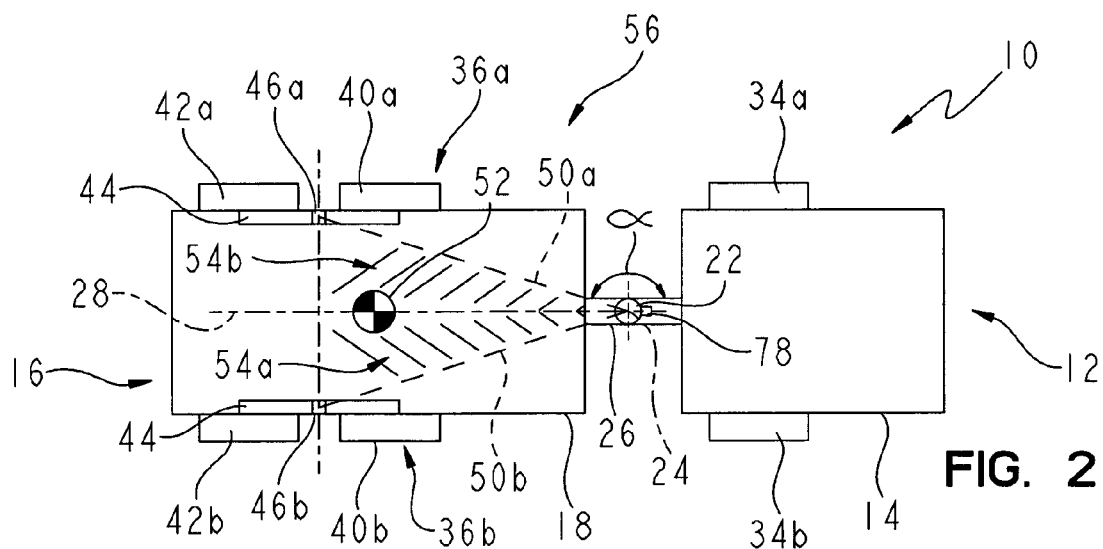
FIG. 2 is a top schematic view of the articulated vehicle of FIG. 1, showing the first frame and the second frame in an aligned position.

Referring initially to FIGS. 1 and 2, the articulated vehicle 10 of the illustrative embodiment illustratively includes a chassis 11 having a first or cab portion 12 and a second or trailer portion 16. The cab portion 12 includes a first frame 14, and the trailer portion 16 includes a second frame 18. The first frame 14 is connected to the second frame 18 through a coupling assembly 20. The coupling assembly 20 includes pivot frame coupling 22 which provides for articulated movement, or turning, of the second frame 18 relative to the first frame 14 about a vertical axis 24. The coupling assembly 20 further includes an oscillatory frame coupling 26 which provides for pivoting movement, or oscillation, of the second frame 18 relative to the first frame 14 about a longitudinal axis 28.

The first frame 14 illustratively supports an operator's cab 30 and an engine 31 for propelling the vehicle 10. A first or front wheel assembly 32 supports the cab portion 12 and is operably coupled to the first frame 14. The first wheel assembly 32 includes a pair of wheels 34a and 34b.

A bin 35 for containing a load is supported by the second frame 18. An actuator, such as a hydraulic cylinder 37, may be coupled to the bin 35 for angularly elevating the bin 35 relative to the second frame 18 (as shown in phantom in FIG. 1). Left and right second or rear wheel assemblies 36a, 36b are supported by the second frame 18 and each illustratively includes a front wheel 40 and a rear wheel 42. Each of the front wheels 40 and the rear wheels 42 are rotatably coupled to a tandem or walking beam 44. The tandem 44 is pivotally coupled to the second frame 18 through a pivot tandem coupling 46. Operation of the tandem 44 facilitates pivoting movement of the front wheel 40 relative to the rear wheel 42 about the coupling 46, thereby facilitating continuous ground engagement by the wheels 40 and 42.

As shown in FIG. 2, during a normal or unrestricted mode or operation, a line of action 50a, 50b extends between the pivot frame coupling 22 and each tandem coupling 46a, 46b. The trailer portion 16, including the second frame 18, the bin 35 and any load supported therein, define a center of gravity 52. It is well known that if the center of gravity 52 moves out of the stability regions 54a, 54b defined between the longitudinal axis 28 and the lines of action 50a, 50b (FIG. 2), then the trailer portion 16 will become unstable and may roll over. Therefore, the term "line of action" as used to describe the present invention is a line that if crossed by the center of gravity may result in instability.

The present disclosure includes a stabilization system 56 which is configured to move the lines of action 50a, 50b outwardly further away from the longitudinal axis 28 and the geometric center of the trailer portion 16.

Figure 3:
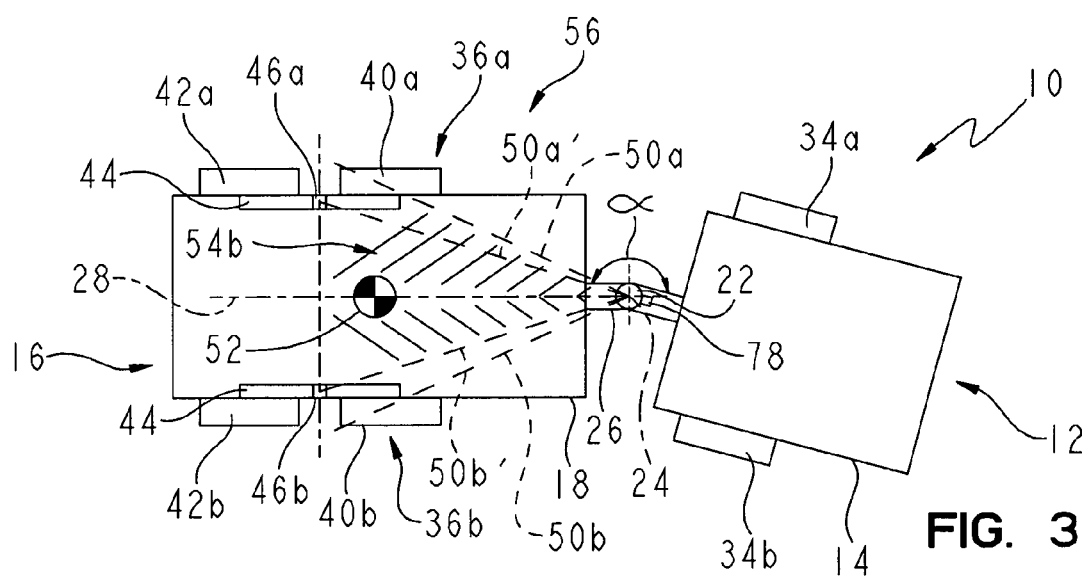
FIG. 3 is a top schematic view similar to FIG. 2, showing the second frame in a first articulated position relative to the first frame.

As shown in FIG. 3, the illustrative stabilization system 56 cooperates with the second wheel assemblies 36a, 36b to move the respective line of action 50a, 50b outwardly away from the longitudinal axis 28 from its position 50a', 50b' in the unrestricted mode of operation. As the angle of articulation α between the first frame 14 and the second frame 18 about the pivot frame coupling 22 increases, the line of action 50a, 50b moves further outward until it intersects a center of the respective front wheel 40 (line of action 50a shown in FIG. 4).

The stabilization system 56 is operably coupled to the second frame 18 and is configured to prevent the center of gravity 52 from traveling outwardly from the longitudinal axis 28 beyond the line of action 50a, 50b. The stabilization system 56 illustratively includes a stabilizer 58 coupled between the second frame 18 and the tandem 44 of each rear wheel assembly 56a, 56b. In the illustrative embodiment of the present disclosure, the stabilizer 58 comprises an actuator, such as a hydraulic cylinder 60 including a cylindrical body 62 receiving a movable piston 64. A rod 66 is coupled to the piston 64 for movement therewith. A free end 68 of the rod 66 is pivotally coupled to a mounting block 70 which, in turn, is coupled to the tandem 44. A mounting bracket 72 of the body 62 of the cylinder 60 is pivotally coupled to the second frame 18. While the illustrative embodiment uses a hydraulic cylinder 60, it should be appreciated that other devices may be substituted therefor. More particularly, any device configured to provide resistance to pivoting movement of the tandem 44 may be used, such as pneumatic cylinders, spring mechanisms, and other electromechanical adjusting elements.

The stabilizer 58 is configured to "stiffen", or resist pivoting movement of, the tandem 44 in response to an input 74 from a vehicle condition sensor. More particularly, the stabilizer 58 is configured to increase resistance to pivoting movement of the tandem 44 about the tandem coupling 46 in response to such an input 74. Illustratively, the stabilizer 58 is in communication with a controller 76 which controls the operation of the stabilizer 58. In one illustrative embodiment, the input 74 is from an articulation angle sensor 78 which is operably coupled to the pivot frame coupling 22. As the first frame 14 articulates or pivots relative to the second frame 18 about the pivot frame coupling 22, the angle α is measured by the articulation angle sensor 78 and provided to the controller 76. As the measured angle α increases, the controller causes the stabilizer 58 to limit pivoting movement of the tandem 44. The articulation angle sensor 78 may comprise a conventional potentiometer, or other similar angle sensor. In a further illustrative embodiment, the articulation angle sensor 78 may be integrated within the vehicle steering system (not shown).

Inputs 74', 74" may also be provided by other vehicle condition sensors, alone or in combination with the articulation angle sensor 78. For example, a speedometer 82 may be coupled to the controller 76 and configured to measure the speed of the vehicle 10. In response to the measured speed, the controller 76 controls operation of the stabilizer 58. More particularly, the controller 76 increases dampening, or resistance to movement, of tandem 44 as the measured speed increases. In a further illustrative embodiment, a bin inclination sensor 84 may be coupled to the controller and configured to measure the angle of inclination of the bin 35 relative to the second frame 18. In response to the measured angle of inclination, the controller controls operation of the stabilizer 58. More particularly, the controller 76 increases dampening, or resistance to movement, of tandem 44 as the measured angle increases. A user interface 85 may also be provided for the operator to access the controller 76, for example, to modify settings or input instructions. The user interface 85 may be of conventional design, such as a keypad or control panel, and is illustratively positioned within the cab 30.

Figure 6:
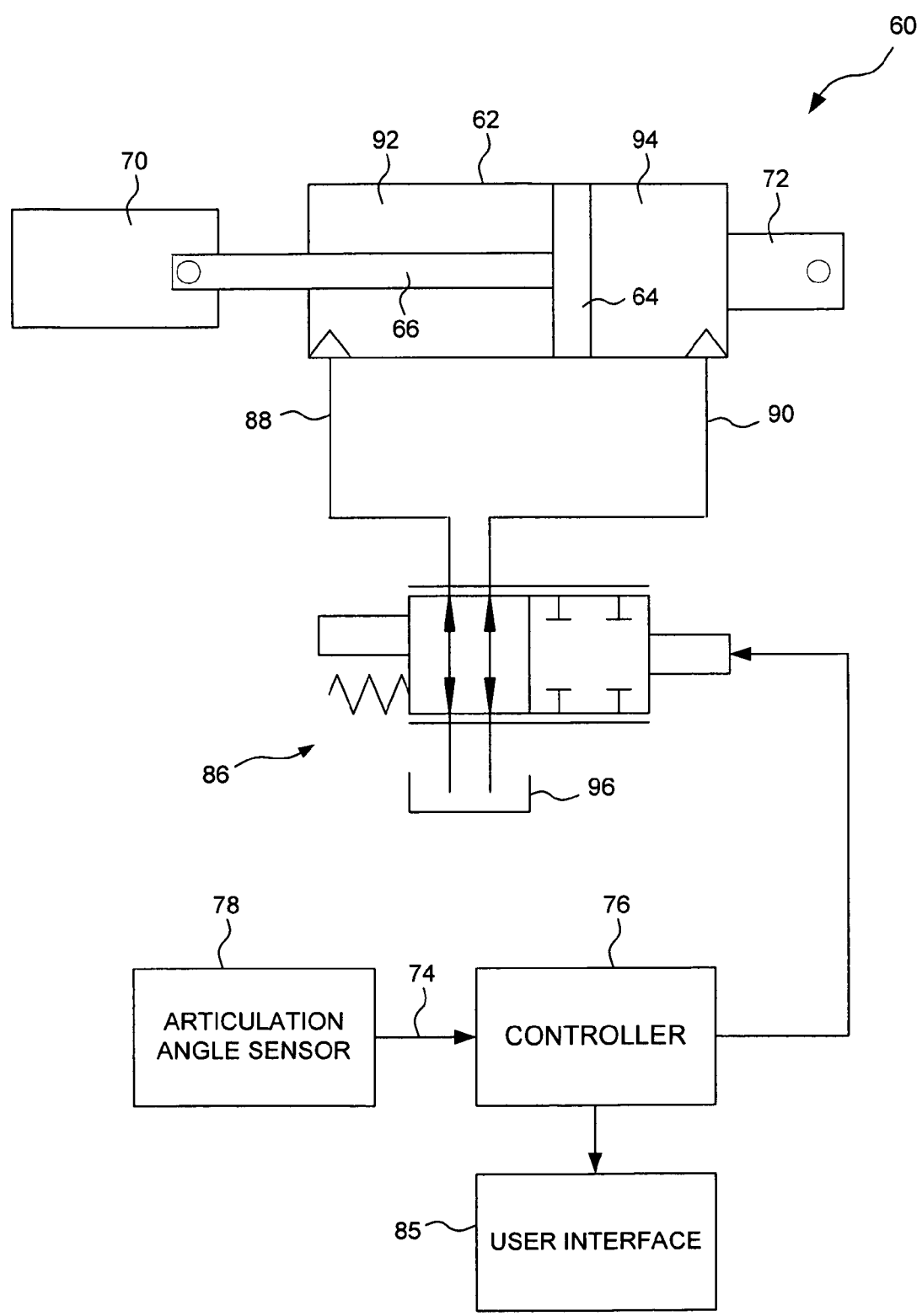
FIG. 6 is a schematic diagram of the illustrative embodiment stabilization system.
Figure 7:
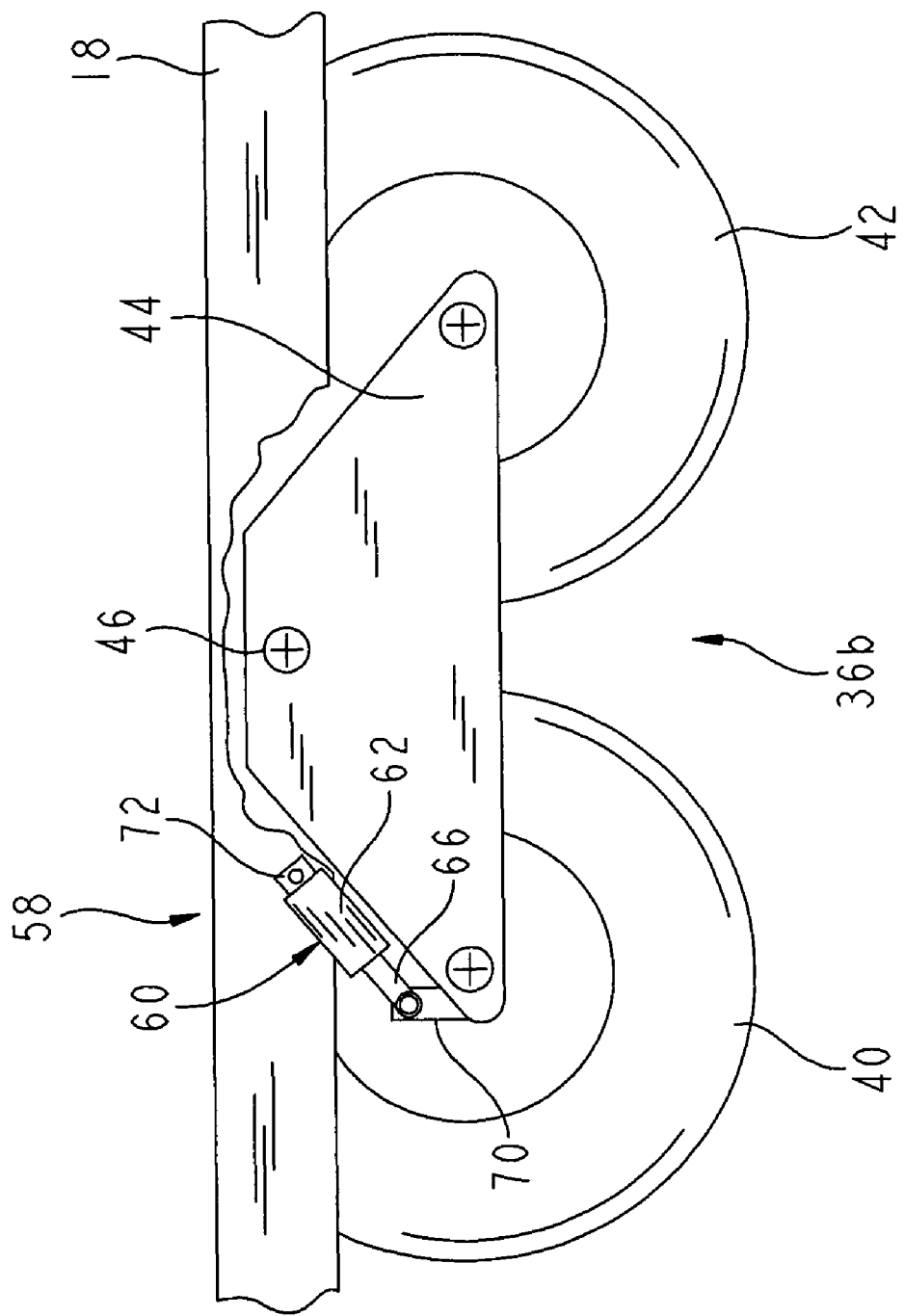
FIG. 7 is a side view, in partial schematic, of an illustrative embodiment rear wheel assembly of the vehicle of FIG. 1.

Referring now to FIG. 6, one illustrative embodiment of the stabilization system 56 includes a two-position, four-way control valve 86 which is operated by the controller 76. Lines 88 and 90, which are in fluid communication with respective chambers 92 and 94 of the hydraulic cylinder 60, are selectively connectable, via the proportional valve 86, to a tank or fluid reservoir 96. The valve 86 is configured to be moved by the controller 76 for incrementally isolating the hydraulic cylinder 60 from the reservoir 96.

In the normal or unrestricted mode of operation, fluid is permitted to flow between the reservoir 96 and the hydraulic cylinder 60. As the input 74 provided by the sensor 78 to the controller 76 indicates an increase in the articulation angle α, the valve 86 begins to close and increases resistance to the additional pivoting movement of the tandem 44. In this partially closed situation, the cylinder 60 acts as a damper. When the measured articulation angle α reaches a predetermined value, the valve 86 closes, thereby isolating the hydraulic cylinder 60. As such, the hydraulic cylinder 60 opposes further pivoting movement of the tandem 44.

As the cylinder 60 causes resistance to movement of the tandem to increase, the line of action 50 moves in a direction away from the tandem pivot coupling 46 toward the center of the front wheel 40. In other words, the stability region 54 increases as the line of action 50 moves outwardly away from the geometric center and longitudinal axis 28 of the second frame 18. When the cylinder 60 is completely isolated, the line of action 50 extends from the pivot frame coupling 22 to the center of the front wheel 40. As may be appreciated, by moving the line of action 50 toward the front wheel 40, stability of the trailer portion 16 is increased since the line of action 50 is positioned further from the center of gravity 52.

In a further illustrative embodiment of the stabilization system 56, an electro-hydraulic pressure reducing valve may be used to modify the load distribution from the rear wheel 42 to the front wheel 40, resulting in a better supported load while the second frame 18 is articulated relative to the first frame 14.

In yet another illustrative aspect of the stabilization system 56, the oscillatory frame coupling 26 may be controlled, illustratively by dampening, to facilitate the transmission of torque therethrough from the second frame 18 to the first frame 14 in response to articulation about the pivot frame coupling 22. In other words, the coupling 26 permits the transmission of torque to resist roll-over of the trailer portion 16, while also preventing the roll-over of the cab portion 12. The torque may be transferred through the use of a clutch (not shown) on the oscillatory shaft (not shown) that provides for oscillation between the second frame 18 and the first frame 14. The amount of torque transmitted can be varied as a function of the articulation between the first and second frames 14, 18 or any other vehicle condition such as the speed of ADT 10. Illustratively, the amount of torque transferred is limited to avoid tipping the cab portion 12 with the trailer portion 16 in the event of a bin dump.

Figure 4:
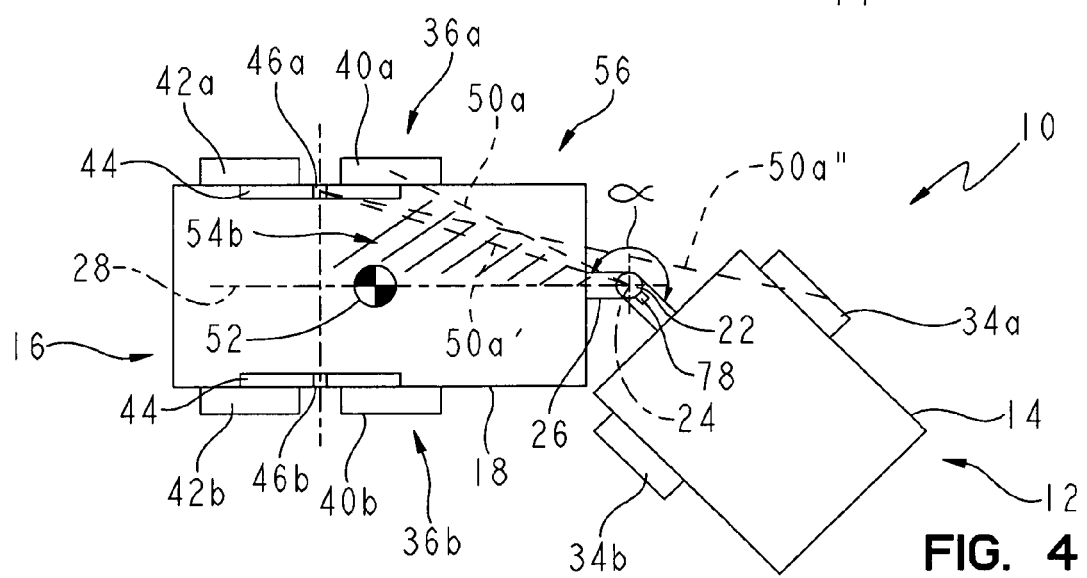
FIG. 4 is a top schematic view similar to FIG. 2, showing the second frame in a second articulated position relative to the first frame.
Figure 5:
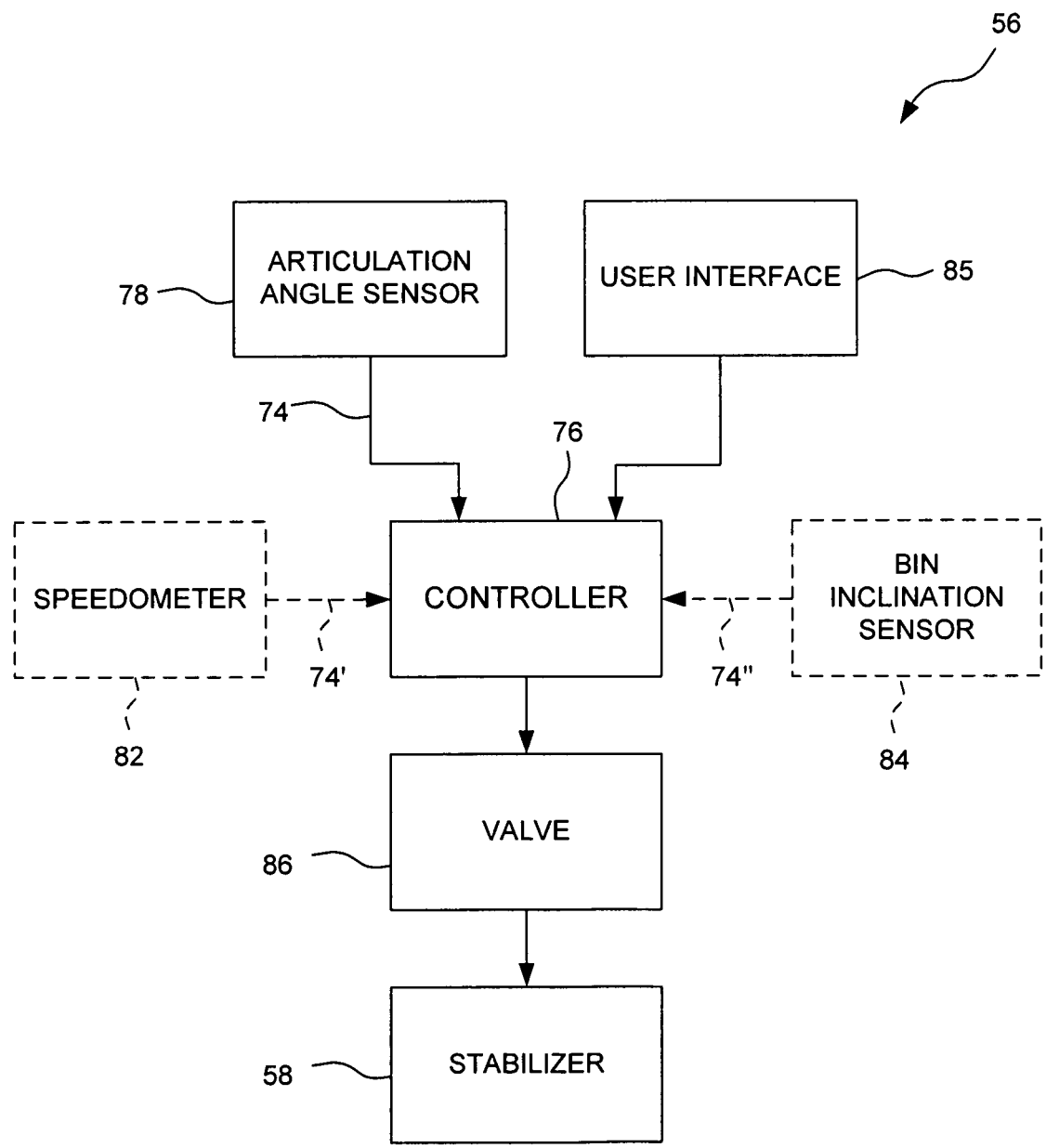
FIG. 5 is a block diagram of the illustrative embodiment control system of the stabilization system of FIG. 1.

As shown in FIG. 4, by increasing the transmission of torque through the coupling 26, the line of action 50a" is moved outwardly away from the longitudinal axis 28. More particularly, the line of action 50a" is moved outwardly from a position intersecting the pivot axis 22. In the illustrative embodiment as shown in FIG. 4, upon full implementation of the stabilization system 56, the line of action 50a" intersects the wheel 34a of the cab portion 12. It should be appreciated that by combining the dampening of the tandem 44 and the dampening of the oscillatory frame coupling 26, the line of action 50a could be moved to intersect points proximate both the wheel 40a and the wheel 34a, respectively.

Although the invention has been described in detail with reference to certain preferred embodiments, variations and modifications exist within the spirit and scope of the invention as described and defined in the following claims.

The invention claimed is:

1. A vehicle including:
a chassis including a cab portion, a trailer portion, and a coupling assembly being positioned between the cab portion and the trailer portion;
the trailer portion being configured to support a load, and defining a longitudinal axis and a center of gravity;
the coupling assembly including a pivot coupling configured to provide pivoting movement between the cab portion and the trailer portion about a vertical axis;
a wheel assembly coupled to the trailer portion;
a line of action associated with the trailer portion;
a controller and a vehicle condition sensor in communication with the controller, the controller being configured to adjust the position of the line of action in response to input from the vehicle condition sensor; and
a stabilization system operably coupled to the chassis, the stabilization system configured to move the line of action outwardly in response to changes in a vehicle condition;
wherein the wheel assembly includes a tandem pivotally coupled to the trailer portion at a tandem coupling, a front wheel rotatably supported by the tandem, and a rear wheel rotatably supported by the tandem in longitudinally spaced relation to the front wheel;
wherein the stabilization system includes an actuator operably coupled to the tandem, the actuator configured to restrict pivoting movement of the tandem, thereby moving the position of the line of action relative to the center of gravity;
and wherein the vehicle condition sensor senses the angle of vertical inclination of a bed supported by the trailer portion relative to the trailer portion and the controller controls the amount of resistance to pivoting movement of the tandem in response thereto.

2. The vehicle of claim 1, wherein the stabilization system is configured to resist movement of the center of gravity from outside of a stable region defined between the longitudinal axis and the line of action.

3. The vehicle of claim 1, wherein the coupling assembly further includes an oscillatory coupling configured to provide pivoting movement of the trailer portion relative to the cab portion about the longitudinal axis, the stabilization system being configured to move the line of action outwardly from a position proximate the pivot coupling.

4. The vehicle of claim 1, wherein the line of action extends from proximate the tandem coupling to proximate the pivot coupling in an unrestricted mode of operation.

5. The vehicle of claim 4, wherein the stabilization system is configured to move the line of action outwardly from a position proximate the tandem coupling to a position proximate the front wheel.

6. The vehicle of claim 4, wherein the actuator comprises a hydraulic cylinder.

7. The vehicle of claim 1, wherein the vehicle condition sensor comprises one of a speedometer configured to measure the speed of the vehicle, an articulation angle sensor configured to measure the angle of the trailer portion relative to the cab portion about the vertical axis, and an inclinometer configured to measure the angle of a bin supporting the load relative to the trailer portion.

8. A vehicle including:
a first frame;
a first wheel assembly operably coupled to the first frame;
a second frame defining a longitudinal axis;
a second wheel assembly operably coupled to the second frame, the second wheel assembly including a tandem pivotally coupled to the second frame at a pivot coupling, a front wheel rotatably supported by the tandem, and a rear wheel rotatably supported by the tandem;
a bin supported by the second frame and configured to support a load;
a frame coupling between the first frame and the second frame, the coupling configured to provide pivoting movement between the first frame and the second frame about a vertical axis;
a vehicle condition sensor configured to detect a condition of the vehicle;
a controller in communication with the vehicle condition sensor;
and a stabilizer operably coupled to the second frame and the tandem, the stabilizer configured to restrict pivoting movement of the tandem in response to the condition sensed by the vehicle condition sensor;
wherein the vehicle condition sensor senses the angle of vertical inclination of a bed supported by the second frame relative to the second frame and the controller controls the amount of resistance to pivoting movement of the tandem in response thereto.

9. The vehicle of claim 8, wherein the second frame, the bin, and the load together define a center of gravity, a line of action extends between the wheel assembly and the frame coupling, and the stabilizer is controlled to prevent the center of gravity from traveling to a position outside of the line of action from the longitudinal axis.

10. The vehicle of claim 9, wherein the stabilizer comprises a hydraulic cylinder.

11. The vehicle of claim 9, wherein the stabilizer is configured to move the line of action from a position intersecting the pivot coupling of the tandem to a position intersecting the front wheel.

12. The vehicle of claim 8, wherein the controller increases the resistance to pivoting movement of the tandem as the pivoting movement between the first frame and the second frame increases.

13. The vehicle of claim 8, wherein the vehicle condition sensor comprises an articulation angle sensor configured to measure the angle of the second frame relative to the first frame about the vertical axis.

14. A method of stabilizing a vehicle, the method comprising the steps of:
providing a vehicle having a first frame and a second frame that are Pivotally connected to one another by a pivot frame coupling to steer the vehicle, the first frame having a first wheel assembly and the second frame having a second wheel assembly, the second wheel assembly including a tandem pivotally coupled to the second frame at a tandem coupling, a front wheel rotatably supported by the tandem and a rear wheel rotatably supported by the tandem, and a stabilizer operably coupled to the tandem;
pivoting the first frame relative to the second frame by an articulation angle about the pivot coupling;
sensing a vehicle condition;
controlling the stabilizer in response to the sensed vehicle condition;
and wherein the sensing step comprises sensing the angle of vertical inclination of a bed supported by the second frame relative to the second frame, and the controlling step comprises controlling the amount of resistance to pivoting movement of the tandem in response thereto.

15. The method of claim 14, wherein a line of action extends between the wheel assembly and the frame coupling, and the controlling step includes moving the line of action from a position intersecting the tandem coupling to a position intersecting the front wheel.

16. The method of claim 14, wherein the sensing step comprises sensing the articulation angle between the first frame and the second frame, and the controlling step comprises controlling the amount of resistance to pivoting movement of the tandem in response thereto.

17. The method of claim 14, wherein the sensing step comprises sensing the speed of the second frame, and the controlling step comprises controlling the amount of resistance to pivoting movement of the tandem in response thereto.

* * * * *